Figure 1:
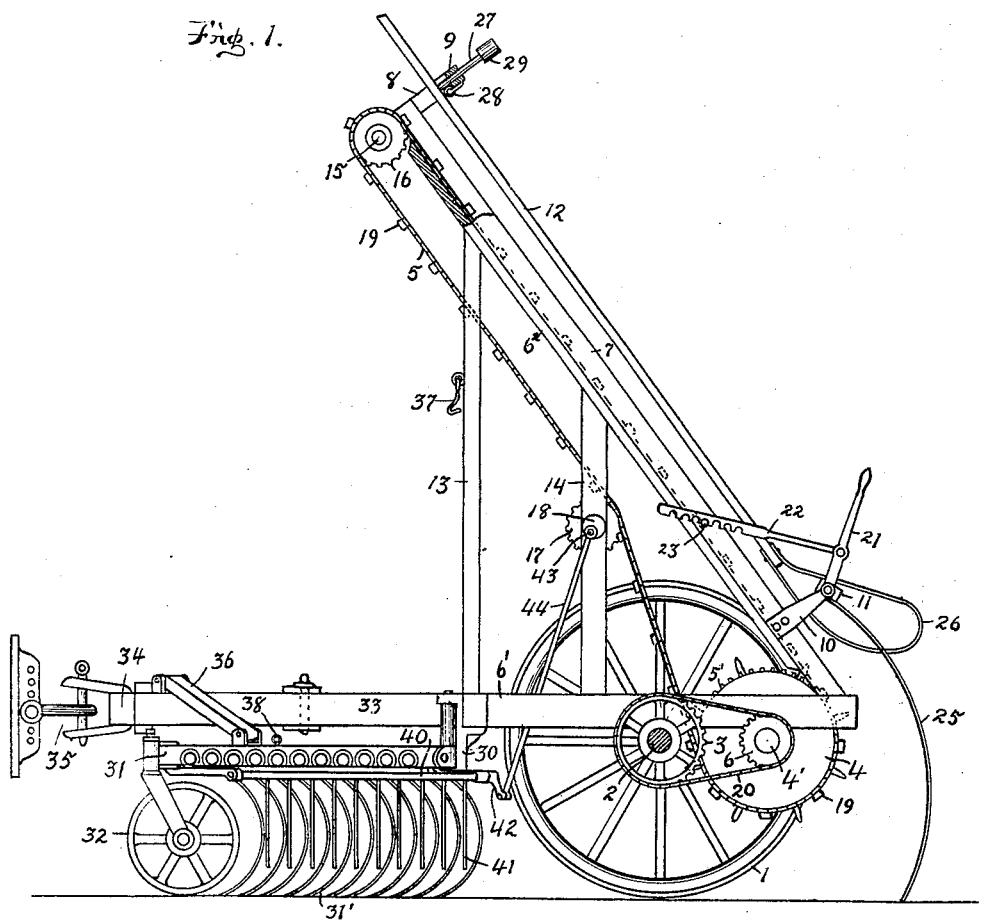

No. 773,278. PATENTED OCT. 25, 1904.
E. COX.
HAY LOADER.
APPLICATION FILED MAY 23, 1904.
NO MODEL. 3 SHEETS—SHEET 1.

WITNESSES: Elmer Cox INVENTOR

No. 773,278. PATENTED OCT. 25, 1904.
E. COX.
HAY LOADER.
APPLICATION FILED MAY 23, 1904.
NO MODEL. 3 SHEETS—SHEET 2.

WITNESSES: Elmer Cox INVENTOR

BY Chapin & Denny

His ATTORNEYS.

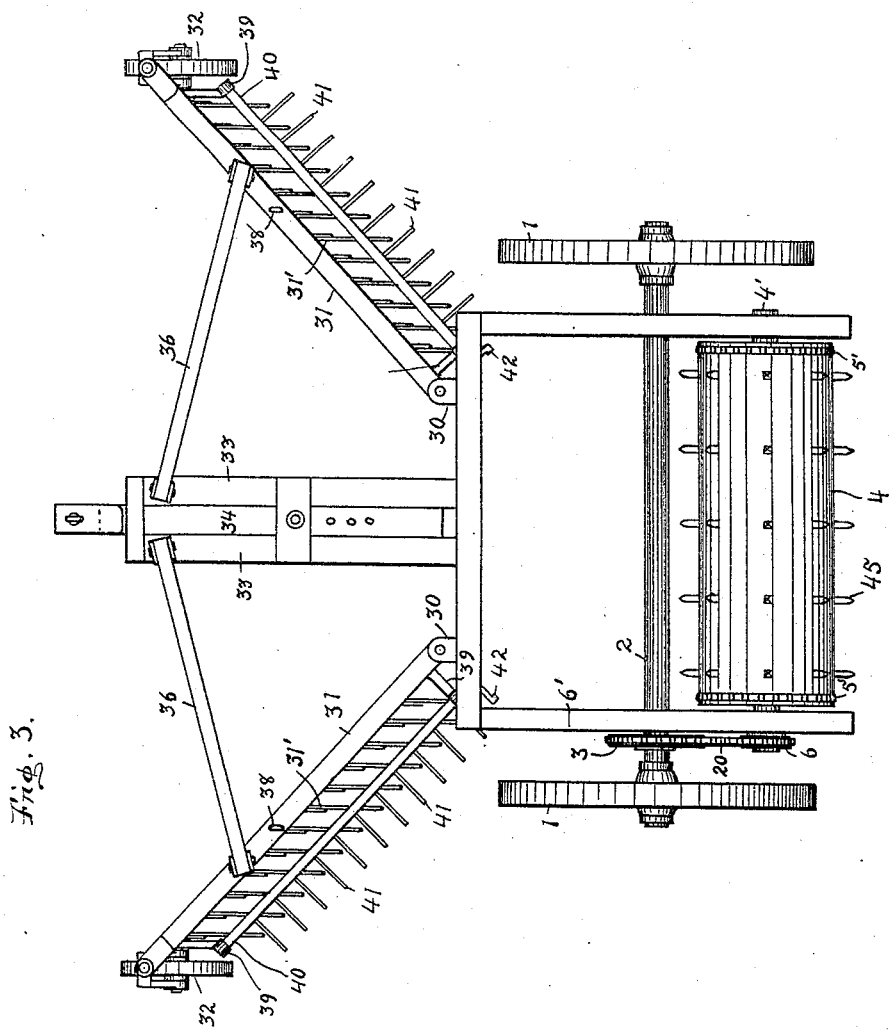

No. 773,278. Patented October 25, 1904.

UNITED STATES PATENT OFFICE.

ELMER COX, OF COLUMBIA CITY, INDIANA.

HAY-LOADER.

SPECIFICATION forming part of Letters Patent No. 773,278, dated October 25, 1904.

Application filed May 23, 1904. Serial No. 209,150. (No model.)

*To all whom it may concern:*

Be it known that I, ELMER COX, a citizen of the United States, residing at Columbia City, in the county of Whitley, in the State of Indiana, have invented certain new and useful Improvements in Hay-Loaders; and I do hereby declare that the following is a full, clear, and exact description of the invention, which will enable others skilled in the art to which it appertains to make and use the same, reference being had to the accompanying drawings, which form part of this specification.

My invention relates to improvements in hay-loaders.

The object of my present invention is to provide a simple, convenient, and efficient hay-loader or loading attachment for a hay-wagon adapted to be operated or driven from the supporting ground-wheels and adapted to deliver the hay from the ground to the top of the load at the rear end of the wagon upon which it is loaded and provided with a novel arrangement of adjustable side rakes having automatically-operated means for keeping the said rakes free from hay in use.

My invention consists of a forwardly-inclined carrier-frame rigidly fixed on a two-wheeled truck adapted to be pivotally connected to the rear end of a hay-wagon, a drum rigidly fixed on a rotatable shaft arranged directly in the rear of the said driving-shaft and provided upon its ends with fixed sprocket-teeth adapted to actuate the carrier-belt, means for actuating the drum-shaft from the said driving-shaft, a guide-frame on the carrier-frame and spaced in substantially parallel relation with its upper face, a traveling carrier-belt mounted on the said sprocket-drum from which it is actuated and passing over a series of sprocket-wheels on the carrier-frame and consisting of a pair of chains connected by a series of spaced cross-bars provided with means for securing the hay upon the carrier and with means for aiding its discharge therefrom, a rake pivotally suspended from the rear end of the carrier-frame and provided with means for securing the same in any desired vertical adjustment, a pair of adjustable lateral oblique rakes adapted to feed the hay to the traveling carrier, means for automatically discharging the hay from the said oblique rakes to prevent an obstructing accumulation of hay thereon in use, and means for yieldingly holding the hay on the ascending carrier.

The principal novel features of my present invention are the improved means for feeding the hay to the carrier from an area wider than the machine, means for keeping the feeding means free of obstruction in use, and means for yieldingly holding the hay on the ascending carrier.

In the accompanying drawings similar reference-numerals indicate like parts throughout the several views, in which—

Figure 2:
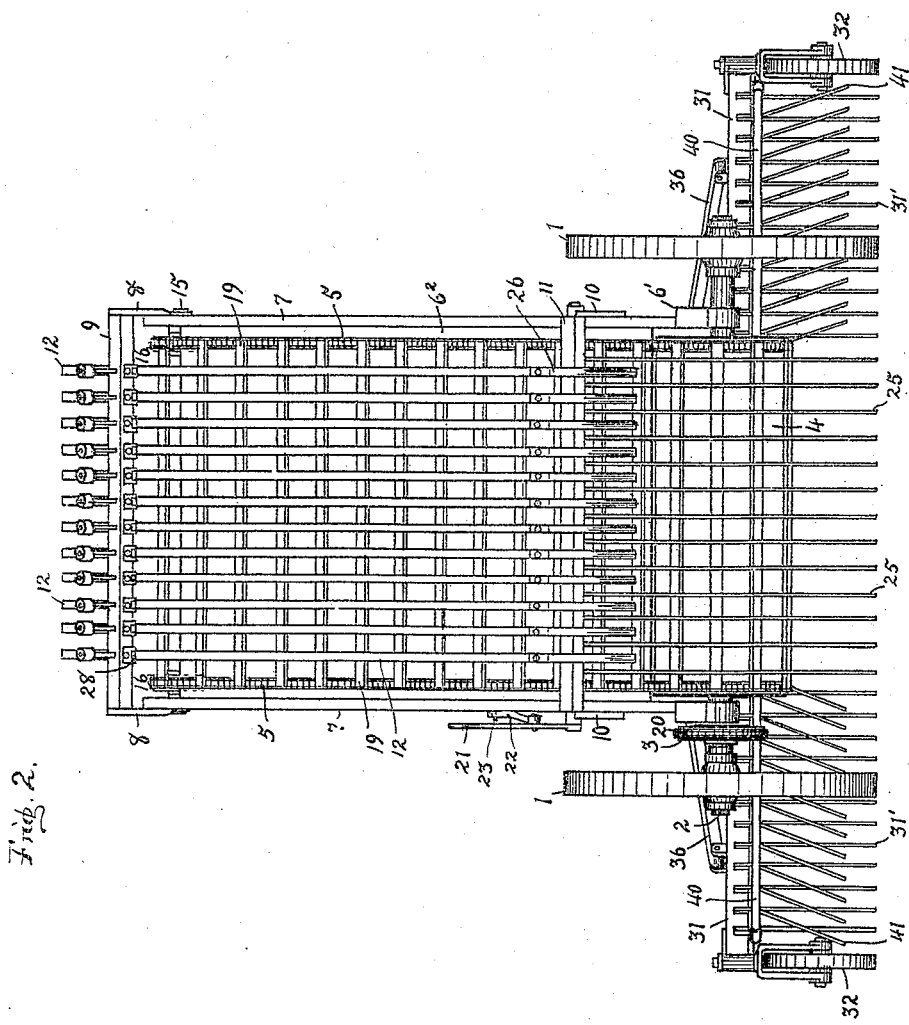

Figure 1 is a side elevation of my invention with one ground-wheel omitted and showing the upper end of the carrier, partly cut away. Fig. 2 is a rear elevation of the machine, showing the relative arrangement of the operative parts. Fig. 3 is a plan of the truck and side rakes, showing the relative arrangement of the means for keeping these rakes free from hay in use.

The ground-wheels 1, of proper size, are mounted on the rotatable axle 2, carrying at or near one end thereof a fixed sprocket-wheel 3.

In suitable bearings at the rear of the driving-axle 2 is rotatably mounted a shaft 4', carrying a fixed drum 4, provided at its opposite ends with the peripheral sprocket-teeth 5', the said shaft having upon one extended end a rigid sprocket-wheel 6, adapted to be actuated from the driving-shaft by means of the sprocket-chain 20, connecting it with the said sprocket-wheel 3. On this axle 2 is fixed a horizontal frame 6', to the rear side of which is fixed the forwardly-inclined frame $6^2$, having opposite upright sides 7, to which are fixed the upright standards 8, to which are fixed the cross-piece 9 and to which are fixed the forward end of the parallel bars 12, which are arranged sufficiently close together to aid in retaining the ascending hay upon the traveling carrier. The frame $6^2$ is rigidly supported on each side by the upright posts 13 and 14, Fig. 1. In suitable supports at the upper end of the frame 6² is rotatably mounted the horizontal transverse shaft 15, carrying upon its opposite ends the rigid sprocket-wheels 16. In one post, 14, is loosely mounted a stud-shaft 18, carrying upon its inner end a rigid sprocket-wheel 17, adapted to be actuated by one of the carrier's belt-chains 5.

An endless flexible carrier, having a sprocket-chain 5 at each side thereof, is loosely mounted on the drum 4, and one of these chains then actuates the sprocket-wheel 17. The chains 5 pass over the sprocket-wheels 16, which are rigid on the ends of the shaft, all of which sprocket-wheels are in engagement with the respective chains 5. This carrier has a series of transverse bars 19 in parallel arrangement and secured at each end to the respective chains 5.

Each of the bars 12 at or near its forward end has a fixed pin 27, which passes loosely through a suitable opening in the transverse bar 9 and has a rigid weight 29 on its upper free end adapted to press the bars 12 down to engage the ascending hay on the carrier. To the rear face of the bar 9 are fixed a series of antifriction-rollers 28, against which the respective pins 27 impinge, and thereby obviate all tendency to binding in use.

On the standards 10 is pivotally suspended the transverse rear rake-beam 11, to which is rigidly fixed an upright hand-lever, to which is pivotally connected the rear end of the forwardly-projecting arm 22, whose forward end is provided upon its lower face with a series of notches adapted to form a holding engagement with the pin 23 in the side 7 of the carrier-frame and is adapted to secure the rear rake, consisting of the beam 11 and the curved teeth 25, at any desired adjustment, Fig. 1.

To the lower end of each bar 12 is rigidly secured the forward end of the spring-steel loops 26, which passes around the beam 11, and thereby limits the play or adjustment of the lower end of the bar 12 in both directions in use.

At the front end of the frame 6' and at the opposite sides thereof are fixed the pendent hangers or standards 30, Fig. 1, whose lower ends are pivotally connected to the inner ends of the bars 31, whose outer ends are supported by the swiveled wheels 32, respectively. To the rear face of the bars 31 are fixed a series of proper rake-teeth 31'.

To the forward end of the frame 6' and midway of its ends are rigidly fixed the parallel bars 33, between which is slidably mounted an extension-bar 34, provided upon its forward end with a clevis-like connection 35.

The bars 31 of the forward rakes, which in use are arranged in an oblique position, as shown, are pivotally connected to the respective bars 33 by means of the rods 36, whereby when the invention is not in use or is being hauled to or from the field the forward rakes can be readily elevated into substantially a vertical position and secured in such position by engaging the hooks 37 on the standards 13 with the staples 38 on the bars 31.

The beam 31 has near its ends a pair of rearwardly-projecting arms 39, in whose outer ends is rotatably mounted a rocking rod 40, provided with a series of pendent pins 41 in coöperative arrangement with the said adjacent oblique rakes. The inner end of this rod 40 has a rigid crank 42, which is pivotally connected to an eccentric-pin 43 on the adjacent end of the shaft 18 by means of the rod 44, adapted to actuate the means for keeping the side rakes free of hay in use and consisting of the rock-rod 40 and the teeth or pins 41.

The operation of my invention thus described is obvious and, briefly stated, is as follows: The forward movement of the ground-wheels will actuate the drum 4 through the medium of the sprocket-wheels 3 and 6 and the connecting-chain 20, thereby so actuating the carrier as to elevate the hay, which is delivered to it by the rear rake in the usual manner. The oblique side rakes gather the hay and feed it rearwardly to the rear rake. The movement of the traveling carrier actuates the rocking rod or lever 40 through the medium of the wheel 17 and the rod 44, thereby keeping the side rakes free from any undue accumulation of hay in use. The weighted pin 27 and the spring-steel loop 26 permit a limited play of the bar 12, which hold the ascending hay in position upon the carrier, from which it is delivered to the wagon, with which my machine is connected in the usual manner.

Having thus described my invention and the manner of employing the same, what I desire to secure by Letters Patent is—

1. In a hay-loader, a truck having an upright inclined carrier-frame; a rotatable drum mounted on the truck-frame in the rear of the driving-axle and adapted to be actuated thereby; a traveling carrier-belt mounted on said frame and said drum; means for yieldingly holding the hay upon the carrier-belt; a pivotally-mounted rake arranged at the rear of the truck and provided with means for adjusting the same; a pair of rakes in oblique arrangement in front of the truck and adapted to aid in delivering the hay to the rear rake; and means for automatically keeping the side rakes free from an accumulation of hay in use.

2. A truck having an oblique carrier-frame and a rigid sprocket-wheel on the axle; a rotatable drum mounted on the truck-frame at the rear of the axle, and provided with a driving connection therewith; a carrier-belt mounted on said frame and said drum; means for yieldingly pressing the ascending hay to its engagement with the carrier-belt; a pivoted rear rake and means for adjusting the same; a pair of oblique rakes arranged in front of the truck and pivotally connected therewith; means for keeping the said oblique rakes free of hay consisting of a rocking bar arranged in the rear thereof and having a series of pendent pins in coöperative relation therewith; and means for automatically actuating the said rocking bar.

3. In a hay-loader a truck; an inclined carrier-frame fixed on the truck; a carrier-belt mounted on said frame; means for actuating the said belt; means for yieldingly holding the hay upon the carrier-belt, consisting of a series of longitudinal strips arranged above the belt and in coöperative relation therewith, having their upper end provided with a weighted pin loosely mounted in a suitable support, and having their lower ends provided with spring-loops as described, adapted to limit the vertical play thereof; a rake arranged in coöperative relation with the lower end of said belt and said strips; and means for securing the said rake in any desired vertical adjustment.

4. In a hay-loader a pair of pivotally-mounted rakes in oblique arrangement and in front of the machine, adapted to direct the hay toward the center of the machine in position to be acted upon thereby; and means for automatically disengaging the hay from the rakes, consisting of a rocking bar arranged adjacent to the rear face of the rakes and provided with a series of pendent pins or teeth, and means for automatically rocking the said bar for purpose specified.

Signed by me at Columbia City, Whitley county, State of Indiana, this 18th day of May, 1904.

ELMER COX.

Witnesses:
WILLIAM H. KISSINGER,
OTTO E. GRANT.